(12) United States Patent
Srinivasan et al.

(10) Patent No.: US 12,181,980 B1
(45) Date of Patent: Dec. 31, 2024

(54) SCHEDULING AND PRIORITIZING UPGRADES IN A DATA CLUSTER

(71) Applicant: Dell Products L.P., Round Rock, TX (US)

(72) Inventors: Sharath Talkad Srinivasan, Bengaluru (IN); Prakash Appayya Acharya, Bangalore (IN); Mohammed Abdul Samad, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/451,219

(22) Filed: Aug. 17, 2023

(51) Int. Cl.
*G06F 12/00* (2006.01)
*G06F 9/455* (2018.01)
*G06F 11/14* (2006.01)
*H04L 67/00* (2022.01)

(52) U.S. Cl.
CPC ...... *G06F 11/1464* (2013.01); *G06F 9/45558* (2013.01); *H04L 67/34* (2013.01); *G06F 2009/45595* (2013.01)

(58) Field of Classification Search
CPC ............. G06F 11/1464; G06F 9/45558; G06F 2009/45595; H04L 67/34
See application file for complete search history.

(56) References Cited

U.S. PATENT DOCUMENTS

2020/0097198 A1* 3/2020 Bansal .................. G06F 3/0604
2024/0296098 A1* 9/2024 Phatak ................ G06F 11/1451

* cited by examiner

*Primary Examiner* — Arvind Talukdar
(74) *Attorney, Agent, or Firm* — Chamberlain, Hrdlicka, White, Williams & Aughtry; Aly Dossa

(57) ABSTRACT

Techniques described herein relate to a method for managing upgrades of backup agents in a data cluster. The method may include identifying, by a data protection manager, a backup agent upgrade event associated with a backup agent type of backup agent types and a data cluster that includes production hosts that execute virtual machines (VMs); in response to identifying the backup agent upgrade event: obtaining production host information associated with the production hosts; obtaining protection policy information associated with the production hosts; generating an upgrade schedule specifying a portion of production hosts associated with backup agent upgrades of backup agents of the backup agent type using the production host information and the protection policy information; and initiating performance of backup agent upgrades on the portion of production hosts based on the upgrade schedule.

20 Claims, 6 Drawing Sheets

SCHEDULING AND PRIORITIZING UPGRADES IN A DATA CLUSTER

BACKGROUND

Computing devices may include any number of internal components such as processors, memory, and storage. Each of the internal components of a computing device may be used to generate data. The data may be important to users. Accordingly, backups of the data may be generated to protect the data. The process of generating and storing backups of the data may be performed by backup components of the computing device. Different backup components may generate backups in different ways. The backup components may be upgraded over time to ensure proper functionality.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

DETAILED DESCRIPTION

Figure 1A:
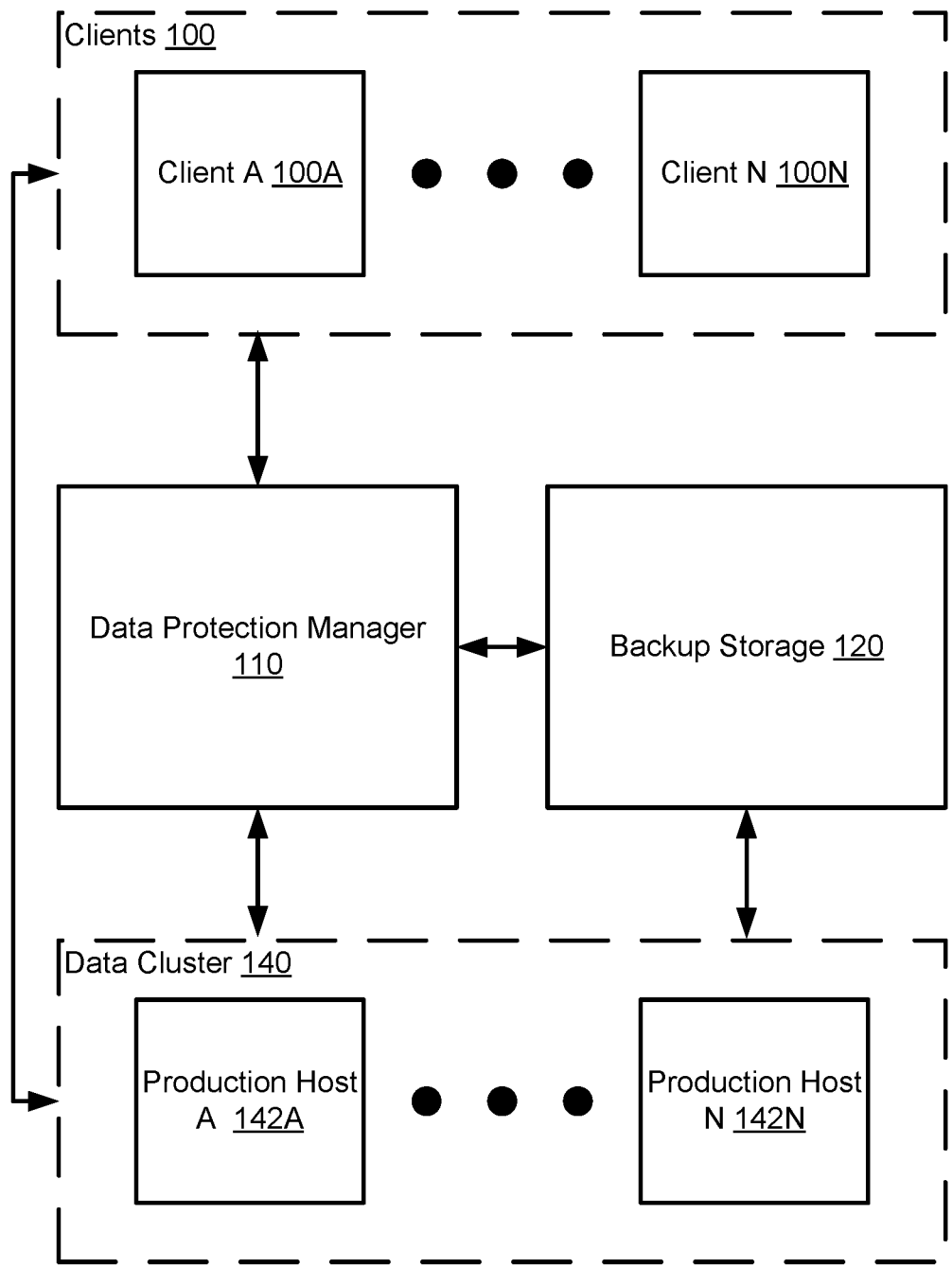
FIG. 1A shows a diagram of a system in accordance with one or more embodiments disclosed herein.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments disclosed herein relate to decoupling data protection manager upgrades from backup agent upgrades in a data cluster associated with the data protection manager. Additionally, embodiments of the invention may provide an intelligent priority driven schedule of execution of backup agent upgrades where priority and production host inclusion is dynamically re-calculated based on changing circumstances. Embodiments disclosed herein may freeze an upgrade of backup agents on a production hosts, so it gets delayed rather than canceled. Presently, data protection manager and backup agent upgrades are tightly coupled with each other.

In one or more embodiments, the data protection manager may support two different virtual machine (VM) data protection methodologies for VMware based VMs: (i) a VMware vStorage API for Data Protection (VADP) backup and (ii) a Transparent Snapshot Data Mover (TSDM) backup. Other data protection methodologies may be used without departing from embodiments disclosed herein.

In one or more embodiments, to perform VADP protection, a backup may be performed using a helper VM (e.g., a vProxy) by taking a snapshot of the VM. These snapshots are attached to the helper VM before the data is transmitted over a network to a backup storage.

In one or more embodiments, to perform TSDM VM protection, a backup may be performed without the help of any helper VM. With a TSDM backup, a light weight delta (LWD) snapshot is created on the production host using a backup agent implemented using vSphere Installation Bundle (VIB) packages and the backup agent may transmit these delta changes to a backup storage.

There are several differences between VADP and TSDM backups. First, for TSDM backups every host should be installed with a current version of a backup agent (i.e., VIB package) without which TSDM backup will not be supported. However, VADP backups do not require updated backup agents to be installed on the hosts. Additionally, TSDM backups are supported on VMware vCenter (VC) version 7.02U2 and above which means that any production host associated VC version below this version may only support VADP VM protection. Moreover, TSDM backups are very fast compared to VADP backups as there is no involvement of a helper VM. This implies that in future all customers and/or users will be expected to use TSDM backups extensively.

Additionally, a user may specify whether a VM is to be protected using TSDM backups or VADP backups using protection policies. To note, TSDM backups may only be enabled on a VM which is residing on the TSDM eligible production host with a VC version 7.02 U2 or above. Furthermore, one data cluster may support up to 2500 VM hypervisors. When the data protection manager is upgraded, all the TSDM based backup agents on eligible production hosts (on hosts with VC 7.0.2 and above) should also be upgraded, without such upgrade the TSDM backup is not supported and subsequent TSDM backups would fail.

Traditionally during a backup agent upgrade, either backup agents associated with TSDM may be upgraded successfully or, on failure, all the TSDM complainant VMs may be changed to VADP protection. Every time the backup agent type is changed, the next backup may be full backup which is a huge performance risk and consumption of time and resources for the system and user.

Now, when the user upgrades the data protection manager, all the backup agents associated with TSDM on the eligible production hosts need to be upgraded simultaneously for the TSDM backups to work. There are many situations where backup agent upgrades ends up with a failure which implies TSDM backups would fail after the upgrade. There may be limitations in the upgrade path which result in these failures. Presently, all the backup agents of the backup agent type associated with TSDM on all eligible production hosts upgraded with the latest backup agent version without any check. This may create havoc on the existing systems with failure scenarios, making the upgrade path tedious and cumbersome. Below are some of the issues faced in the existing upgrade workflow which may be overcome by implementing one or more embodiments disclosed herein.

Reasons and consequences of backup agent upgrade failures on the host: (1) in case of backup agent upgrade failure, there is no way to upgrade to the latest version on the host manually, (2) the backup agent upgrade path is tightly coupled with the data protection manager upgrade path which would impact the overall upgrade experience if there is an upgrade failure (e.g., timeout, add overall delay, false positive upgraded version in the host server, etc.), (3) user of the data protection manager has no control on filtering the production hosts of the data center from installation and upgrade, (4) if the user wants to use VADP, for the assets associated with a backup policy which is TSDM compliant, then user would need to manually override the protection policy for each VM asset associated with the policy resulting in a cumbersome task, (5) in a large-scale environment, system upgrade may fail or timeout as backup agent upgrades on all hosts would take considerable time because backup agent upgrade is tightly coupled with data protection manager upgrade, resulting in bad user experience, (6) users cannot schedule when the backup agent upgrades should kick in (e.g., if host backup agent upgrade coincides with the production host maintenance, power off, or backup generation schedules, then the backup generation and/or backup agent upgrades may end up with failures which may result in data loss scenarios), (7) there is no intelligence to reschedule the backup agent upgrade to a later stage, and (8) there are limitations in the VC in performing and monitoring multiple upgrades simultaneously on all the hosts.

To address, at least in part, the problems discussed above with upgrading backup agents, embodiments disclosed herein relate to methods for prioritizing and scheduling when and how the backup agent upgrades should be performed on each production host in the system without affecting the user or the existing backup policy schedules. In one or more embodiments, the status of the underlying servers, existing backup policy status, backup policy schedules, types of assets in the policy, number of assets in backup mechanisms, and the size of the assets per backup mechanism are evaluated to intelligently prioritize, schedule, and reschedule backup agent upgrades on the production hosts.

Any upgrade path in a multi-node environment may be able to intelligently evaluate when and how any upgrades should be pushed to all its components without affecting the user or disturbing the backup policy schedules. Embodiments disclosed herein may improve the reliability and efficiency of performing backup agent upgrades.

FIG. 1A shows a diagram of a system in accordance with one or more embodiments disclosed herein. The system may include clients (100), a data protection manager (110), backup storage (120), and a data cluster (140). The system may include additional, fewer, and/or different components without departing from the embodiments disclosed herein. Each component may be operatively connected to any of the other components via any quantity and combination of wired (e.g., Ethernet) and/or wireless (e.g., Internet, Wide Area Networks (WANs), Local Area Networks (LANs), etc.) networks (not shown). While illustrated as including a specific quantity of certain components, the system may include other, fewer, or additional components without departing from embodiments disclosed herein. Each of the aforementioned components is discussed below.

In one or more embodiments disclosed herein, the clients (100) may be configured to, or otherwise programmed to, include the functionality to use services provided by the data protection manager (110) and the data cluster (140). Specifically, the clients (100) may use virtual machines (VMs) (discussed below) hosted by production hosts (discussed below) of the data cluster (140) to perform computer implemented services that generate, obtain, modify, and/or store data. The data may be generated from the VMs hosted in the production hosts of the data cluster (140). The clients (100) may also use data protection services to generate backups of VM assets (the data generated, obtained, modified, and/or stored in the VMs). To use the aforementioned services provided by the data protection manager (110) and the data cluster (140), the clients (100) may further include the functionality to send and/or obtain messages, commands, data, and/or information to and/or from the data protection manager (110) and the data cluster (140). There may be any quantity of clients (100) without departing from embodiments disclosed herein. For example, the clients (100) may include a single client such as client A (100A). Alternatively, the clients (100) may include multiple clients such as client A (100A) and client N (100N).

Figure 3:
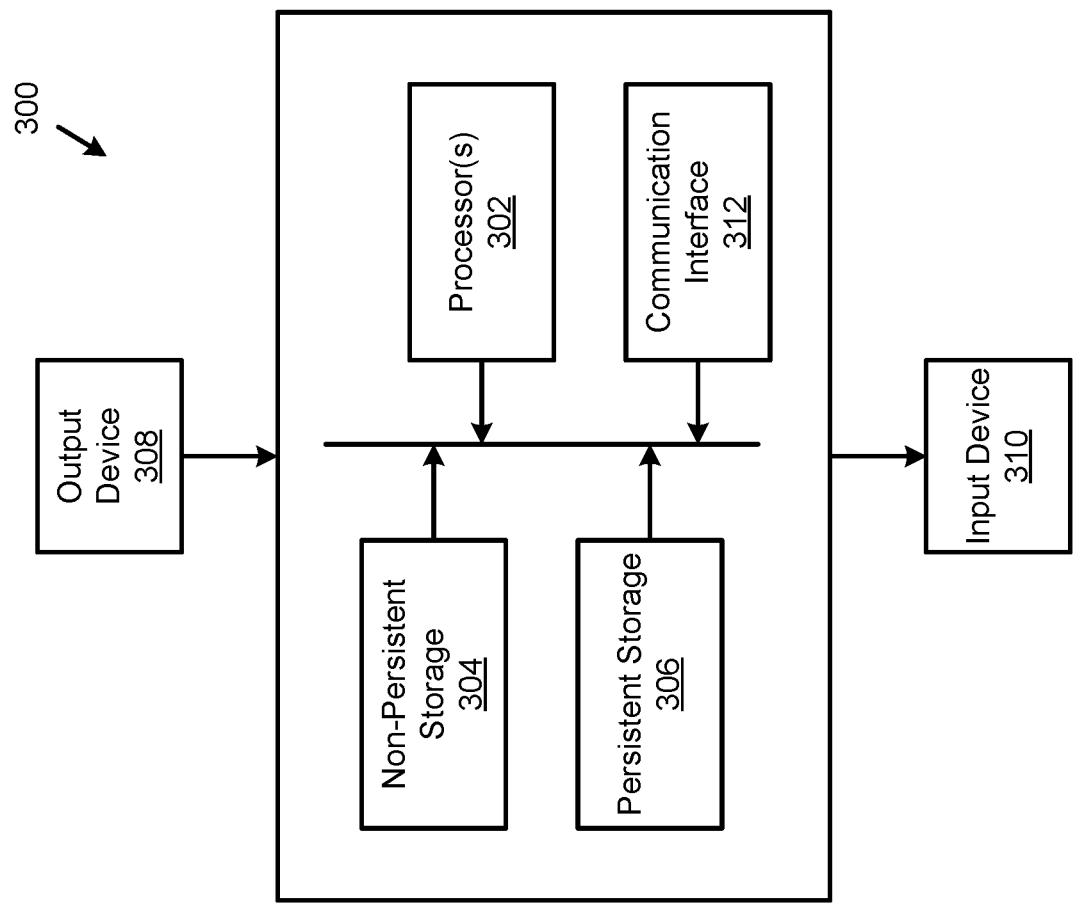
FIG. 3 shows a diagram of a computing device in accordance with one or more embodiments disclosed herein.

In one or more embodiments disclosed herein, the clients (100) are implemented as one or more computing devices (see e.g., FIG. 3). A computing device may be, for example, a mobile phone, a tablet computer, a laptop computer, a desktop computer, a server, a distributed computing system, or a cloud resource. The computing device may include one or more processors, memory (e.g., random access memory), and storage (e.g., disk drives, solid state drives, etc.). The computing device may include instructions, stored on the storage, that when executed by the processor(s) of the computing device cause the computing device to perform the functionality of the clients (100) described throughout this application.

In one or more embodiments disclosed herein, the clients (100) are implemented as a logical device. The logical device may utilize the computing resources of any number of computing devices and thereby provide the functionality of the clients (100) described throughout this application.

In one or more embodiments disclosed herein, the data protection manager (110) may be configured to, or programmed to, include the functionality to provide data protection services for the clients (100) by managing the generation of backups of VM assets in the data cluster (140).

To manage the generation of the backups, the data protection manager (110) may also include the functionality to orchestrate one or more backup agents on the production hosts of the data cluster (140) to generate backups and send the backups to the backup storage (120). The data protection manager (110) may include other and/or additional functionalities without departing from embodiments disclosed herein. For additional information regarding the data protection manager (110), refer to FIG. 1B.

In one or more embodiments disclosed herein, the data protection manager (110) is implemented as a computing device (see e.g., FIG. 3). The computing device may be, for example, a mobile phone, a tablet computer, a laptop computer, a desktop computer, a server, a distributed computing system, or a cloud resource. The computing device may include one or more processors, memory (e.g., random access memory), and storage (e.g., disk drives, solid state drives, etc.). The computing device may include instructions, stored on the storage, that when executed by the processor(s) of the computing device cause the computing device to perform the functionality of the data protection manager (110) described throughout this application.

In one or more embodiments disclosed herein, the data protection manager (110) is implemented as a logical device. The logical device may utilize the computing resources of any number of computing devices and thereby provide the functionality of the data protection manager (110) described throughout this application.

In one or more embodiments disclosed herein, the backup storage (120) includes the functionality to obtain and store backups of assets of the VMs hosted by the production hosts of the data cluster (140). Additionally, the backup storage (120) may further include the functionality to provide backups to production hosts of the data cluster (140) to perform restorations of VM assets. The backup storage may include other and/or additional functionalities without departing from embodiments disclosed herein.

In one or more embodiments disclosed herein, the backup storage (120) is implemented as a computing device (see e.g., FIG. 3). The computing device may be, for example, a mobile phone, a tablet computer, a laptop computer, a desktop computer, a server, a distributed computing system, or a cloud resource. The computing device may include one or more processors, memory (e.g., random access memory), and storage (e.g., disk drives, solid state drives, etc.). The computing device may include instructions stored on the storage that, when executed by the processor(s) of the computing device, cause the computing device to perform the functionality of the backup storage (120) described throughout this application.

In one or more embodiments disclosed herein, the backup storage (120) is implemented as a logical device. The logical device may utilize the computing resources of any number of computing devices and thereby provide the functionality of the backup storage (120) described throughout this application.

In one or more embodiments disclosed herein, the data cluster (140) may refer to a collection of production hosts (e.g., 142A). The data cluster (140) may include any quantity of production hosts (e.g., 142A, 142N) without departing from embodiments disclosed herein. For example, the data cluster (140) may include production host A (142A), production host N (142N), etc. In one or more embodiments disclosed herein, the production hosts (e.g., 142A) may be configured to, or otherwise programmed to, include the functionality to perform the computer implemented services of the data cluster (140) for clients (100) and/or users of the clients (100). The production hosts (e.g., 142A, 142N) may perform the computer implemented services by executing one or more VMs. Additionally, the production hosts (e.g., 142A, 142N) may further include the functionality to perform local data protection services using instructions obtained from the data protection manager (110). The data cluster (140) may include fewer, other, and/or additional components without departing from embodiments disclosed herein. The production hosts (e.g., 142A, 142N) may include other and/or additional functionalities without departing from embodiments disclosed herein. For additional information regarding production hosts (e.g., 142A, 142N), refer to FIG. 1C.

In one or more embodiments disclosed herein, the production hosts (e.g., 142A, 142N) are implemented as one or more computing devices (see e.g., FIG. 3). A computing device may be, for example, a mobile phone, a tablet computer, a laptop computer, a desktop computer, a server, a distributed computing system, or a cloud resource. The computing device may include one or more processors, memory (e.g., random access memory), and storage (e.g., disk drives, solid state drives, etc.). The computing device may include instructions, stored on the storage, that when executed by the processor(s) of the computing device cause the computing device to perform the functionality of the production hosts (e.g., 142A, 142N) described throughout this application.

In one or more embodiments disclosed herein, the production hosts (e.g., 142A, 142N) are implemented as a logical device. The logical device may utilize the computing resources of any number of computing devices and thereby provide the functionality of the production hosts (e.g., 142A, 142N) described throughout this application.

Figure 1B:
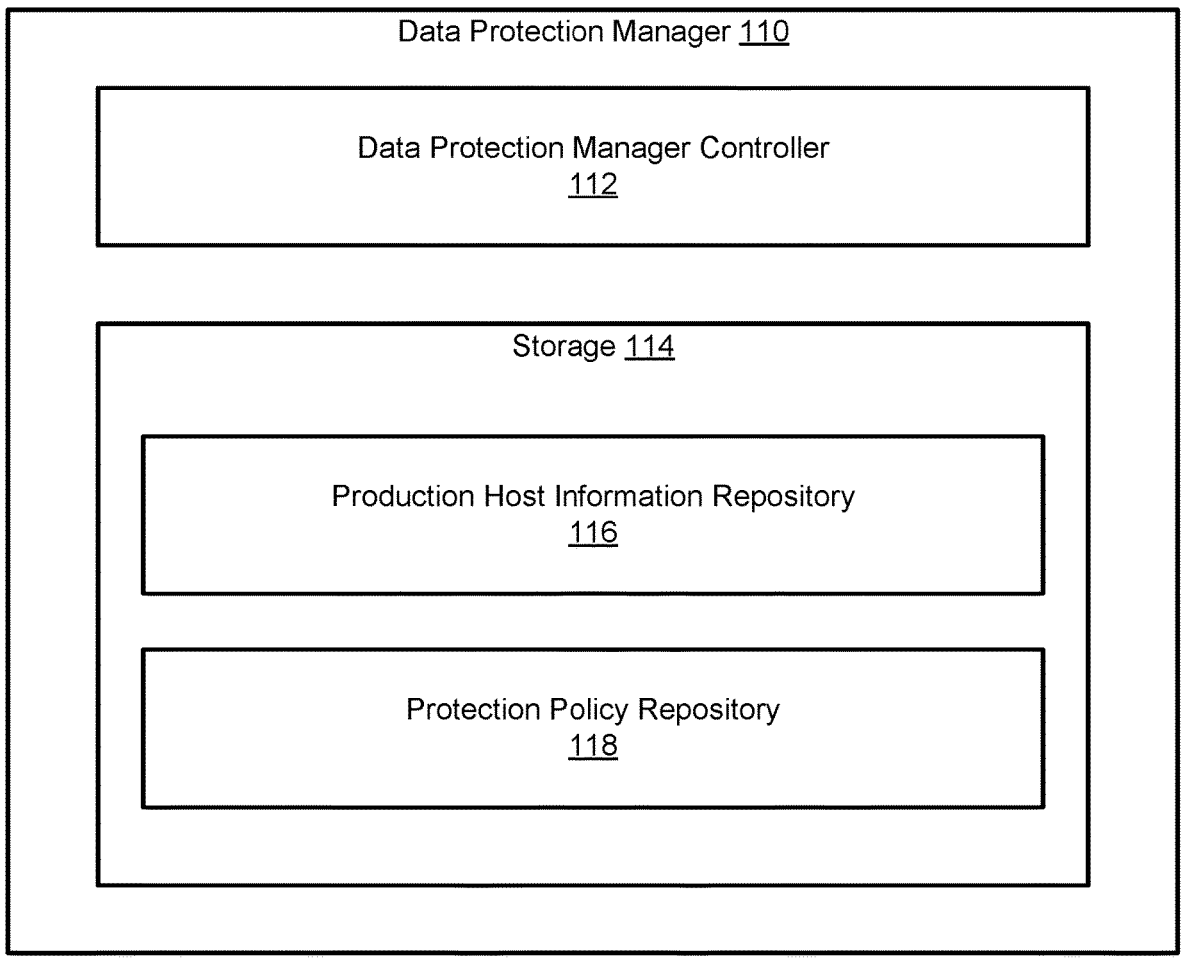
FIG. 1B shows a diagram of a data protection manager in accordance with one or more embodiments disclosed herein.

FIG. 1B shows a diagram of a data protection manager in accordance with one or more embodiments disclosed herein. The data protection manager (110) may be an embodiment of the data protection manager (110, FIG. 1A) discussed above. As discussed above, the data protection manager may include the functionality to provide data protection services for the clients (100, FIG. 1A) by managing the generation of backups of VM assets in the data cluster (140, FIG. 1A). To perform the aforementioned services, the data protection manager (110) may include a data protection manager controller (112) and storage (114). The data protection manager (110) may include other and/or additional components without departing from embodiments disclosed herein. Each of the aforementioned components is discussed below.

In one or more embodiments, the data protection manager controller (112) may be configured, or otherwise programmed, to include the functionality to perform the data protection services of the data protection manager (110). The data protection services may include: (i) generating backup agent upgrade schedules (discussed below) based on identifying backup agent upgrade events (discussed below), (ii) initiating backup agent upgrades based on the backup agent upgrade schedules, and (iii) managing the generation of backups of VM assets on production hosts of the data cluster (140, FIG. 1A). The data protection manager controller (112) may also include the functionality to upgrade the data protection manager (110) to different versions. New versions (e.g., software packages including images, libraries, binaries, etc.) may be obtained from a user and/or third party entities (not shown) and executed by the data protection manager controller (112) or other processor of the data protection manager (110) to upgrade the data protection manager. Newer versions may provide newer functionalities and/or improved performance. The current version of the data protection manager may be specified and stored in storage (114). When a data protection manager is upgraded, some of the backup agents on the production hosts (e.g., 142A, 142N) associated with certain types of backup agent types (discussed below) may also require upgrading in order to properly perform local data protection services. Accordingly, the data protection manager controller (112) may include the functionality to perform the methods discussed in FIGS. 2A-2B to intelligently upgrade backup agents and generate backup agent upgrade schedules respectively. The data protection manager controller (112) may include other and/or additional functionalities without departing from embodiments disclosed herein. For additional information regarding the functionality of the data protection manager controller (112) refer to FIGS. 2A-2B.

In one or more embodiments disclosed herein, the data protection manager controller (112) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the data protection manager controller (112) described throughout this application.

In one or more embodiments disclosed herein, the data protection manager controller (112) is implemented as computer instructions, e.g., computer code, stored on a storage that when executed by a processor of the data protection manager (110) causes the data protection manager (110) to provide the functionality of the data protection manager controller (112) described throughout this application.

In one or more embodiments disclosed herein, the storage (114) may be configured to, or otherwise programmed to, store information. The information stored in storage (114) may include a production host information repository (116) and a protection policy repository (118). The storage (114) may store other and/or additional types of information and include other and/or additional functionalities without departing from the embodiments disclosed herein. Each of the aforementioned types of information stored in the storage (114) is discussed below.

In one or more embodiments, the production host information repository (116) may refer to one or more data structures that include production host entries. Each production host (e.g., 142A, 142N, FIG. 1A) of the data cluster (140, FIG. 1A) may be associated with a separate production host entry. Each production host entry may include production host information associated with the corresponding production host. The production host information may include a production host identifier, a production host hypervisor version (discussed below), a list of VMs executing on the production host (e.g., a list of VM identifiers corresponding to the VMs), a list of VM assets associated with each VM (e.g., a list of VM asset identifiers associated corresponding to the VM assets), the size (i.e., amount of data in either bytes, megabytes, gigabytes, terabytes, etc.) associated with each VM asset, and the production host status indicator. The production host information of a production host entry may further include communication information (e.g., Uniform Resource Locator (URL) address, Internet Protocol (IP) address, usernames, passwords, encryption keys, Application Programming Interface (API) commands, etc.) used to access and transfer information and/or requests to and from the corresponding production host. The production host information of the entries of the production host information repository (116) may include other and/or additional information associated with the production hosts (e.g., 142A, 142N, FIG. 1A) of the data cluster (140, FIG. 1A) without departing from embodiments disclosed herein.

In one or more embodiments, the production host information repository (116) may be maintained by the data protection manager controller (112). The production host information may be generated by and/or obtained from the production hosts by the data protection manager controller (112) and used to generate new production host entries associated with new production hosts added to the data cluster (140, FIG. 1A) or update existing production host entries. The production hosts may generate production host information when the production hosts are instantiated, when production hosts are changed (e.g., new VM instantiated, a VM is deleted, etc.) or on the occurrence of other events without departing from embodiments disclosed herein. The production hosts may send the production host information to the data protection manager (110) upon request from the data protection manager, when new or updated production host information is generated, or periodically according to a user configured schedule. The data protection manager controller (112) may further delete production host entries upon request from the clients (100, FIG. 1A) or users of the clients (100, FIG. 1A). The production host information repository (116) may be used by the data protection manager controller (112) to perform the methods of FIGS. 2A-2B.

As used herein, an identifier associated with an entity may refer to a unique combination of alphanumeric characters that specify that particular entity and may be used to differentiate that entity from other entities. For example, a production host identifier may specify a particular production host, a VM identifier may specify a particular VM, and a VM asset identifier may specify a particular VM asset.

As used herein, the production host status indicator may include values, tags, flags, or other indicators that indicate a status associated with the production host. The status indicator may indicate one of the following production host statuses: (i) on and available (i.e., the production host is powered on and includes an available network connection with the data protection manager (110)), (ii) on and unavailable (i.e., the production host is powered on and does not include an available network connection with the data protection manager (110)), (iii) off (i.e., the production host is powered off) (iv) maintenance (i.e., the production host is unavailable due to ongoing maintenance), and (v) backup generation in progress and may further specify the VM and/or VM assets currently being backed up. The production host status indicator may indicate other and/or additional statuses associated with the production hosts without departing from embodiments disclosed herein.

In one or more embodiments, the protection policy repository (118) may refer to one or more data structures that include protection policies. Each protection policy may be associated with a corresponding VM. Each protection policy may include a protection policy identifier, a corresponding production host identifier, a policy start timestamp specifying the point in time when the policy was generated and implemented, the corresponding VM identifier, the list of VM assets associated with each VM, the backup type (discussed below) associated with each VM asset, storage locations (e.g., storage addresses, pointers, storage device identifiers, device offsets, length, etc.) of the backup storage (120, FIG. 1A) associated with backups to be generated for each VM asset, and a backup schedule specifying points in time to generate backups for each VM asset. The protection policies may include other and/or additional information regarding generating backups of VM assets on production hosts without departing from embodiments disclosed herein.

In one or more embodiments, the protection policy repository (118) may be maintained by the data protection manager controller (112). The protection policies may be generated by the clients (100, FIG. 1A) or users of the clients (100, FIG. 1A) and provided to the data protection manager controller (112) to store new protection policies or update existing protection policies. The data protection manager controller (112) may further delete protection policies upon request from the clients (100, FIG. 1A) or users of the clients (100, FIG. 1A). The protection policy repository (118) may be used by the data protection manager controller (112) to perform the methods of FIGS. 2A-2B.

While the data structures (e.g., 116, 118) are illustrated or discussed throughout this Detailed Description as separate data structures and have been discussed as including a limited amount of specific information, any of the aforementioned data structures may be divided into any number of data structures, combined with any number of other data structures, and may include additional, less, and/or different information without departing from the embodiments disclosed herein. Additionally, while illustrated as being stored in the storage (114), any of the aforementioned data structures may be stored in different locations (e.g., in storage of other computing devices) and/or spanned across any number of computing devices without departing from embodiments disclosed herein. The data structures of the storage (114) may be implemented using, for example: lists, linked lists, tables, unstructured data, databases, etc. While illustrated in FIG. 1B as being stored locally, the data structures (e.g., 116, 118) may be stored remotely and may be distributed across any number of devices without departing from embodiments disclosed herein.

The storage (114) may be implemented using physical storage devices and/or logical storage devices. The storage (114) may be implemented using any combination of volatile and/or non-volatile storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the storage (114) may utilize portions of any combination of hard disk drives, solid state disk drives, tape drives, and/or any other physical storage medium of any number of computing devices.

Figure 1C:
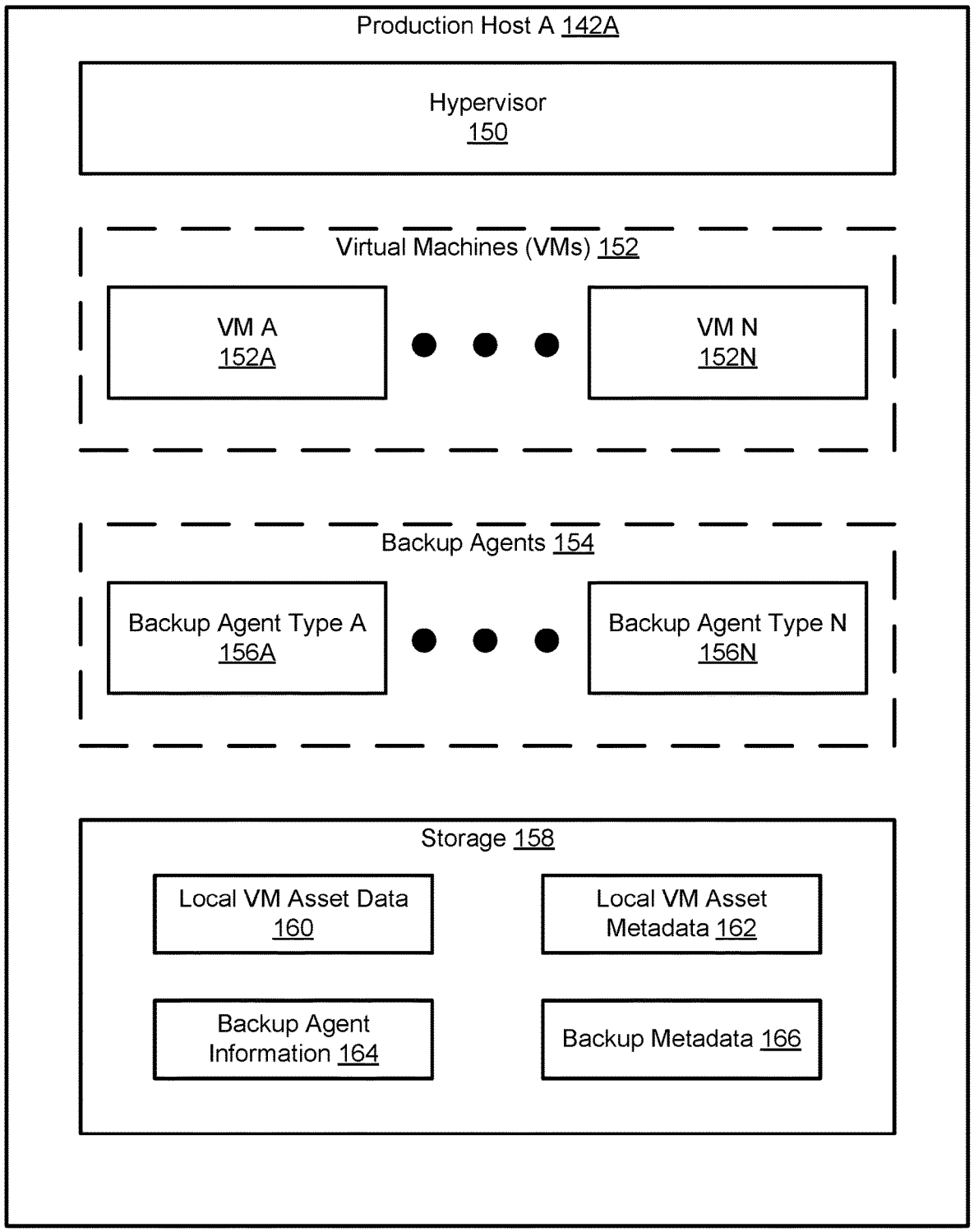
FIG. 1C shows a diagram of a production host in accordance with one or more embodiments disclosed herein.

FIG. 1C shows a diagram of a production host in accordance with one or more embodiments disclosed herein. Production host A (142A) may be an embodiment of a production host (e.g., 142A, FIG. 1A) discussed above. As discussed above, production host A (142A) may include the functionality to provide computer implemented for the clients (100, FIG. 1A) and perform local data protection services based on instructions from the data protection manager (110, FIG. 1A). To perform the aforementioned services, production host A (142A) may include a hypervisor (150), virtual machines (VMs) (152), backup agents (154), and storage (158). The data protection manager (110) may include other and/or additional components without departing from embodiments disclosed herein. Each of the aforementioned components is discussed below.

In one or more embodiments, the hypervisor (150) may be configured to, or otherwise programmed to, include the functionality to orchestrate the operation of the VMs (152). The hypervisor (150) may orchestrate the operation of the VMs (152) and the backup agents (154) by, for example, allocating computing resources to each virtual machine (152A, 152N) and backup agent (156A, 156N), instantiating new VMs (152) and backup agents (154), deleting VMs (152) and backup agents (154), and upgrading backup agents (154). Further, the hypervisor (150) may include the functionality to generate, obtain, and/or provide information about the VMs (152) and backup agents (154) of production host A (142A) to the data protection manager (110, FIG. 1A) as requested by the data protection manager (110), during periodic intervals, after a change in the system is detected by the hypervisor (150), and/or based on any other occurrence without departing from embodiments disclosed herein. The hypervisor may include other and/or additional functionalities without departing from embodiments disclosed herein. The hypervisor (150) may be implemented using a VMware Elastic Sky X Integrated (ESXi) hypervisor. Other types of hypervisors may be used to implement the hypervisor (150) without departing from embodiments disclosed herein.

In one or more embodiments, the hypervisor (150) may be a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (150) described throughout this application.

In one or more of embodiments, the hypervisor (150) may be implemented as computer instructions, e.g., computer code, stored on a storage that when executed by a processor of production host A (142A) causes production host A (142A) to provide the functionality of the hypervisor (150) described throughout this application.

In one or more embodiments disclosed herein, production host A (142A) hosts one or more virtual machines (152). The virtual machines (152) may include any quantity of virtual machines such as, for example, VM A (152A) and VM N (152N). The virtual machines (152) may be logical entities executed using computing resources (not shown) of production host A (142A) (not shown). Each of the virtual machines (152) may be performing similar or different processes. In one or more embodiments, the virtual machines (152) may provide computer implemented services to users, e.g., clients (100). For example, the VMs (152) may host components. The components may be, for example, instances of databases, email servers, and/or other applications. The virtual machines (152) may host other types of components without departing from disclosed herein.

In one or more of embodiments disclosed herein, the virtual machine(s) (152) is implemented as computer instructions, e.g., computer code, stored on a storage that when executed by a processor(s) of production host A (142A), cause production host A (142A) to provide the functionality of the virtual machine(s) (152) described throughout this application.

In one or more embodiments disclosed herein, the backup agents (154) may be configured to, or otherwise programmed to, include the functionality to generate snapshots of the virtual machine(s) (152). The snapshots may include virtual machine data blocks of VM assets included in a file system (not shown). The backup agents (154) may further include the functionality to provide the snapshots of the VMs (152) to the backup storage (120). In one or more embodiments, a file system may be an organizational data structure that tracks how virtual machine data is stored and retrieved in a system (e.g., in storage (158) of production host A (142A), not shown). The file system may specify references to assets of virtual machines and any virtual machine data blocks associated with each asset. The file system may be maintained and updated by the hypervisor (150). An asset may be an individual data object in the file system. An asset may be, for example, a file associated with the virtual machine(s) (152). The snapshot may include a copy of the assets for one or more specified VMs associated with a specified point in time. The copies of virtual machine data blocks included in the snapshot may be used to generate backups.

In one or more embodiments disclosed herein, the backup agents (154) may generate and provide to the backup storage (120) the copies of virtual machine data blocks of assets of the file system based on protection policies (discussed above) obtained from the data protection manager (110, FIG. 1A) and implemented by the backup agents (154). The protection policies may specify a schedule in which the virtual machines (e.g., 152) are to be backed up. The backup agents (154) may be triggered to generate a snapshot of virtual machines (e.g., 152) and provide the virtual machine data block copies to the backup storage (120) in response to a protection policy. Alternatively, one or more of the copies of data blocks of assets of virtual machines may be generated by a snapshot of the virtual machines (152) and provided to the backup storage (120) in response to a backup request triggered by the clients (100). The backup request may specify the virtual machine(s) (152) to be backed up.

In one or more embodiments, the backup agents (154) may include different backup agent types. For example, the backup agents (154) may include backup agent type A (156A) and backup agent type N (156N). The backup agents (154) may include any quantity of backup agent types, and each backup agent type (e.g., 156A, 156N) may include any quantity of backup agents or backup agent instances. While each backup agent type may include the functionality to generate snapshots of VMs and VM assets, each backup type may generate snapshots in different manners. For example, a first backup agent (e.g., backup agent type A (156A) may generate a backup using a helper VM by taking a snapshot of the VM. These snapshots may be attached to the helper VM before the data of the snapshot is transmitted to backup storage. This backup agent type may be implemented using vSphere Storage APIs for Data Protection (VADP). A second backup agent type (e.g., backup agent type N (156N)) may generate a backup without the help of a helper VM. Instead, a Light Weight Delta (LWD) snapshot may be generated on the hypervisor (150) and the backup agent may send the LWD snapshot to the backup storage (120) to generate the backup. This second backup agent type may be implemented using Transparent Snapshot Data Movers (TSDM). The backup agents associated with backup agent type N (156N) may generate backups faster as there is no helper VM required to generate and transmit the snapshot to the backup storage (120). There may be other and/or additional types of backup agent types associated with the backup agents (154) without departing from embodiments disclosed herein.

As discussed above, the data protection manager (110, FIG. 1A) may be upgraded over time. Some backup agent types may be tightly coupled or related to the version of the data protection manager (110, FIG. 1A), and thus may be required to be upgraded themselves when the data protection manager (110, FIG. 1A) is upgraded to maintain proper functionality. If they are not upgraded when the data protection manager is upgraded, the backup agents associated with the aforementioned backup agent types may fail to perform local data protection services. Said another way, the backup agents may not be able to generate snapshots of VMs and transmit the snapshots to the backup storage (120, FIG. 1A). For example, backup agents associated with the TSDM backup agent type may require upgrades when the data protection manager (110, FIG. 1A) is upgraded to maintain proper functionality while the backup agents associated with the VADP backup type may not require upgrades to maintain proper functionality. To intelligently upgrade the necessary backup agents, the methods of FIGS. 2A-2B may be performed.

In one or more embodiments, the backup agents (154) may be implemented as physical devices. A physical device may include circuitry. The physical device may be, for example, a field-programmable gate array, application specific integrated circuit, programmable processor, microcontroller, digital signal processor, or other hardware processor. The physical device may be configured or otherwise adapted to provide the functionality of the backup agents (154) described throughout this application.

In one or more embodiments, the backup agents (154) may be implemented as computer instructions, e.g., computer code, stored on a storage (e.g., 158) that when executed by a processor of production host A (142A) causes production host A (142A) to provide the functionality of the backup agents (154) described throughout this application. The backup agents (154) may be implemented as one or more vSphere Installation Bundle (VIB) packages.

In one or more embodiments, the storage (158) may be configured to, or otherwise programmed to, store information. The information stored in the storage (158) may include local VM asset data (160), local VM asset metadata (162), backup agent information (164), and backup metadata (166). The storage (158) may store other and/or additional information associated with production host A (142A) without departing from embodiments disclosed herein. Each of the aforementioned types of information stored in the storage (158) is discussed below.

In one or more embodiments, the local VM asset data (160) may refer to one or more data structures that include all VM asset data of all VMs (152) executing on production host A (142A). As discussed above, each VM (e.g., 152A) may be associated with one or more VM assets. An asset may be an individual data object in a file system of production host A (142A) associated with a particular VM. As an example, an asset may be a file associated with the virtual machine(s) (152). Accordingly, for a VM associated with a database component, a corresponding asset of the VM may be database file. Thus, the local VM asset data (160) may include the database file data associated with the VM asset. The local VM asset data (160) may include any quantity and/or type of VM asset data of the VM assets associated with the VMs (152) without departing from embodiments disclosed herein. The local VM asset data (160) may be generated and stored by the VMs (152) and/or the hypervisor (150) and used by the backup agents (154) to generate backups of VM assets.

In one or more embodiments, the local VM asset metadata (162) may refer to one or more data structures that include metadata associated with the VM assets. The metadata may include information associated with the VM assets of the VMs (152). The metadata may include, for each VM asset, a VM asset identifier, a VM identifier, the production host identifier, the size of the VM asset (i.e., the amount of data associated with the VM asset), the storage location of the VM asset (i.e., file system path, storage device, storage device offset, file length, pointers, etc.). The local VM asset metadata (162) may include other and/or additional information associated with the VM assets of the VMs (152)

without departing from embodiments disclosed herein. The local VM asset metadata (162) may be generated and stored by the VMs (152) and/or the hypervisor (150) and used by the backup agents (154) to generate backups of VM assets and by the data protection manager (110, FIG. 1A) to generate backup agent upgrade schedules as discussed in FIGS. 2A-2B.

In one or more embodiments, the backup agent information (164) may refer to one or more data structures that include information associated with the backup agents (154). The information may include a list of backup agents and/or backup agent instances (e.g., a list of corresponding backup agent identifiers). The information may further include a backup agent type and a backup agent version associated with each backup agent and/or backup agent instance. Further the information may include the VM (e.g., 152A) and/or the VM assets associated with each backup agent. The backup agent information (164) may include other and/or additional information regarding the backup agents (154) without departing from embodiments disclosed herein. The backup agent information (164) may be generated by the data protection manager (110, FIG. 1A) or derived by the backup agents (154) and/or the hypervisor (150) from protection policies obtained from the data protection manager (110, FIG. 1A). The backup agent information (164) may be used by the backup agents to generate backups of VM assets and may also be provided to the data protection manager (110, FIG. 1A) to be used to generate backup agent upgrade schedules.

In one or more embodiments, the backup metadata (166) may refer to one or more data structures that include information associated with backups of the VM assets. The backup metadata (166) may include backup identifiers associated with backups of VM assets of the VMs (152), VM asset identifiers associated with the backup identifiers, VM identifiers associated with the backup identifiers, timestamps associated with the backup identifiers (i.e., points in time in which the corresponding backups were generated), and storage locations (e.g., storage addresses, pointers, storage device identifiers, device offsets, length, etc.) of the backup storage (120, FIG. 1A) associated with the backup identifiers. The backup metadata (166) may include other and/or additional information associated with backups without departing from embodiments disclosed herein. The backup metadata (166) may be generated by the backup agents (154) and/or the backup storage (120, FIG. 1A). The backup metadata (166) may be used to retrieve backups for restorations, and may also be provided to the data protection manager (110, FIG. 1A) and used to generate backup agent upgrade schedules.

The storage (158) may be implemented using physical storage devices and/or logical storage devices. The storage (158) may be implemented using any combination of volatile and/or non-volatile storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the storage (158) may utilize portions of any combination of hard disk drives, solid state disk drives, tape drives, and/or any other physical storage medium of any number of computing devices.

Figure 2A:
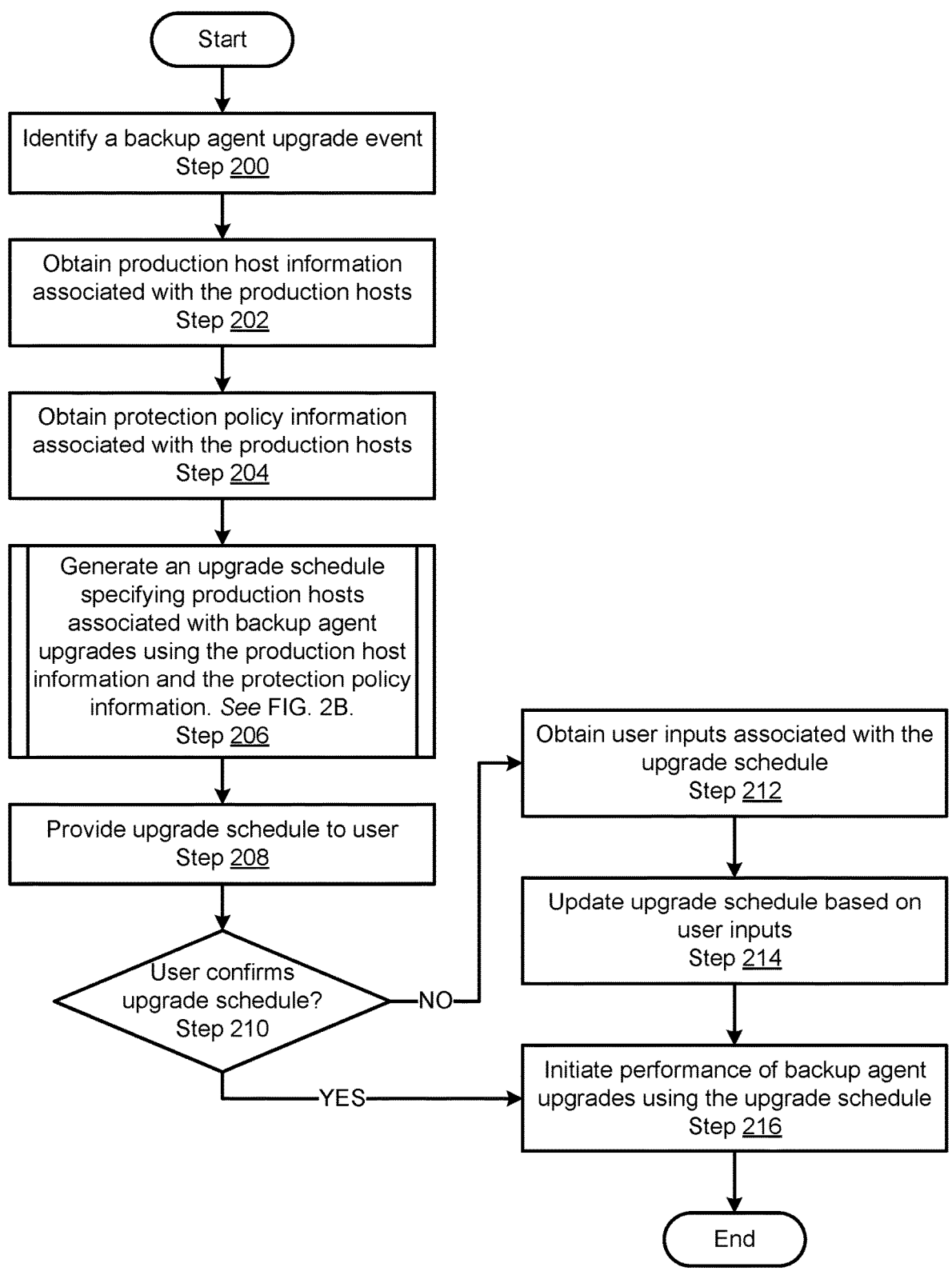
FIG. 2A shows a flowchart of a method for managing the upgrades of backup agents in a data cluster in accordance with one or more embodiments disclosed herein.

FIG. 2A shows a flowchart of a method for managing the upgrades of backup agents in a data cluster in accordance with one or more embodiments disclosed herein. The method shown in FIG. 2A may be performed by, for example, a data protection manager (110, FIG. 1A). Other components of the system illustrated in FIGS. 1A-1C may perform all, or a portion, of the method of FIG. 2A without departing from embodiments disclosed herein. While various steps in the flowchart are presented and described sequentially, one of ordinary skill in the relevant art will appreciate that some or all of the steps may be executed in different orders, may be combined or omitted, and some or all of the steps may be executed in parallel.

In Step 200, a backup agent upgrade event associated with a backup agent type is identified. In one or more embodiments, the data protection manager may wait for the occurrence of a backup agent upgrade event. The backup agent upgrade event may include: (i) the performance of an upgrade of the data protection manager, (ii) when new VM assets are added to a no stun based protection policy, (iii) when a protection policy's backup agent type is updated by a user to a backup type associated with backup agent upgrades (e.g., TSDM backup agent types), (iv) receiving a request from a user to perform a backup agent upgrade associated with a backup agent type, or (v) the occurrence of a point in time specified by a backup agent type upgrade schedule. The data protection manager (110) may monitor protection policies, its own upgrades, incoming user requests, and/or backup type upgrade schedules and identify the occurrence of one of the aforementioned events as the backup agent upgrade event. The backup agent upgrade event may be associated with or otherwise specify the backup agent type targeted for upgrade. For example, the user request and the backup agent upgrade schedule may specify the backup agent type associated with the upgrade. Additionally, the data protection manager may include an indication of backup agent type(s) to upgrade in response to its own upgrades, updates of protection policies to the backup agent types, and/or backup agent types associated with no stun protection policies. The backup agent upgrade event associated with the backup agent type may be identified via other and/or additional methods without departing from embodiments disclosed herein.

In Step 202, production host information associated with production hosts is obtained. In one or more embodiments, the data protection manager may obtain production host information from the production hosts of the data cluster. The data protection manager may send requests for production host information to the production hosts. In response to obtaining the requests, each production host may generate production host information including status indicators, local VM asset metadata, backup agent information, and backup metadata and send the production host information to the data protection manager. The data protection manager may update the production host information repository using the obtained from the production hosts and discard obtained production host information that matches previously obtained production host information stored in the production host information repository. The messages and production host information may be transmitted between the data protection manager and the production hosts using any appropriate method of data transmission without departing from embodiments disclosed herein. For example, the messages and production host information may be sent as messages that include one or more network packets through one or more network devices that operatively connect the data protection manager to the production hosts. The data protection manager may then obtain the updated production host information from the production host information repository. The production host information may be obtained from the production hosts via other and/or additional methods without departing from embodiments disclosed herein.

In Step 204, protection policy information associated with the production hosts is obtained. As discussed above, the data protection manager may maintain a protection policy information repository that includes protection policies associated with the production hosts generated and/or updated by users (e.g., through clients) of the system. In one or more embodiments, the data protection manager may obtain current protection policy information from the protection policy information repository. The protection policy information associated with the production hosts may be obtained via other and/or additional methods without departing from embodiments disclosed herein.

In Step 206, an upgrade schedule specifying production hosts associated with backup agent upgrades is generated using the production host information and the protection policy information. The upgrade schedule specifying production hosts associated with backup agent upgrades may be generated via the methods discussed below in FIG. 2B. For additional information regarding the generation of the upgrade schedule, refer to FIG. 2B. The upgrade schedule specifying production hosts associated with backup agent upgrades may be generated using the production host information and the protection policy information via other and/or additional methods without departing from embodiments disclosed herein.

In Step 208, the upgrade schedule is provided to a user. In one or more embodiments, the data protection manager may provide the upgrade schedule to a user. In one embodiment, the data protection manager may directly provide the upgrade schedule to a user through a user interface (e.g., a graphical user interface, a command line interface, a webpage interface, etc.) on an output device of the data protection manager or operatively connected to the data protection manager. The user may be able to see the upgrade schedule and its contents using the user interface. In alternative embodiments, the data protection manager may send the upgrade schedule to a client used by a user. The client may then provide the upgrade schedule to the user by, for example, using a user interface as discussed above. The upgrade schedule may be transmitted between the data protection manager and the client using any appropriate method of data transmission without departing from embodiments disclosed herein. For example, the upgrade schedule may be sent as a message that includes one or more network packets through one or more network devices that operatively connect the data protection manager to the client. The upgrade schedule may be provided to a user via other and/or additional methods without departing from embodiments disclosed herein.

In Step 210, a determination is made as to whether the user confirms the upgrade schedule. In one or more embodiments, the user may indicate whether they confirm the upgrade schedule. The user may submit an indication (e.g., a command, click a box, enter information through an input device, etc.) that specifies whether the user or not the user confirms the upgrade schedule. In one embodiment, the user may provide the user indications directly to the data protection manager. In other embodiments, the user may provide the indication through a client used by the user. In such embodiments the client may send the user indication to the data protection manager. The user indication may be transmitted between the data protection manager and the client using any appropriate method of data transmission without departing from embodiments disclosed herein. For example, the user indication may be sent as a message that includes one or more network packets through one or more network devices that operatively connect the data protection manager to the client. The data protection manager may use the user indication to determine whether the user confirms the upgrade schedule. In one or more embodiments, if the user indication indicates that the user confirms the upgrade schedule, then the data protection manager may determine that the user confirms the upgrade schedule. In one or more embodiments, if the user indication does not indicate that the user confirms the upgrade schedule (i.e., the user rejects the upgrade schedule), then the data protection manager may determine that the user does not confirm the upgrade schedule. The determination as to whether the user confirms the upgrade schedule may be made via other and/or additional methods without departing from embodiments disclosed herein.

In one or more embodiments disclosed herein, if it is determined that the user confirms the upgrade schedule, then the method proceeds to Step 216. In one or more embodiments disclosed herein, if it is determined that the user does not confirm the upgrade schedule (i.e., rejects, updates, modifies, etc.), then the method proceeds to Step 212.

In Step 212, user inputs associated with the upgrade schedule are obtained. If the user does not confirm the user schedule, then, in addition to the user indication, the user may further provide user inputs specifying updates to the upgrade schedule desired by the user. The updates to the upgrade schedule may include any quantity and/or combination of removing a production host from the upgrade schedule, adding a production host to the upgrade schedule, changing a production host priority in the upgrade schedule, and rescheduling a production host to a future upgrade of the backup agent type. The user may submit inputs (e.g., commands, clicking boxes, enter information through an input device, etc.) that specify one or more user updates to the upgrade schedule. In one embodiment, the user may provide the user inputs directly to the data protection manager. In other embodiments, the user may provide the inputs through a client used by the user. In such embodiments the client may send the user inputs to the data protection manager. The user inputs may be transmitted between the data protection manager and the client using any appropriate method of data transmission without departing from embodiments disclosed herein. For example, the user inputs may be sent as a message that includes one or more network packets through one or more network devices that operatively connect the data protection manager to the client. The user inputs associated with the upgrade schedule may be obtained via other and/or additional methods without departing from embodiments disclosed herein.

In Step 214, the upgrade schedule is updated based on the user inputs. In one or more embodiments, the data protection manager may update the upgrade schedule based on the one or more user inputs obtained from the user. As mentioned above, the user inputs may include removing a production host from the upgrade schedule, adding a production host to the upgrade schedule, changing a production host priority in the upgrade schedule, and rescheduling a production host to a future upgrade of the backup agent type. Thus, the data protection manager may remove one or more production hosts from the upgrade schedule, add one or more production hosts to the upgrade schedule, change one or more production hosts' priority in the upgrade schedule, and/or reschedule one or more production hosts to a future upgrade of the backup agent type. The upgrade schedule may be updated based on the user inputs via other and/or additional methods without departing from embodiments disclosed herein.

In Step 216, the performance of backup agent upgrades are initiated using the upgrade schedule. In one or more embodiments, the data protection manager may initiate the performance of backup agent upgrades associated with the backup type corresponding to the backup agent upgrade event. In one or more embodiments, the data protection manager may send backup agent upgrade requests to production hosts specified by the upgrade schedule. The requests may specify the backup agent type to be upgraded and the version to upgrade the backup agents associated with the backup agent type. The data protection manager may send the requests to production hosts specified in the upgrade schedule that have a higher priority (e.g., listed first in the upgrade schedule) specified by the upgrade schedule before sending requests to production hosts that have a lower priority. In response to obtaining the request, the production hosts may obtain a new version of the backup agent associated with the backup agent type (e.g., from a third party entity not shown in FIG. 1A), install the new version and began executing the new version of the backup agent to upgrade the backup agents associated with the backup agent type. The requests may be transmitted between the data protection manager and the production hosts using any appropriate method of data transmission without departing from embodiments disclosed herein. For example, the requests may be sent as messages that include one or more network packets through one or more network devices that operatively connect the data protection manager to the production hosts. The performance of the backup agent upgrades may be initiated using the upgrade schedule via other and/or additional methods without departing from embodiments disclosed herein.

In one or more embodiments disclosed herein, the method ends following Step 216.

Figure 2B:
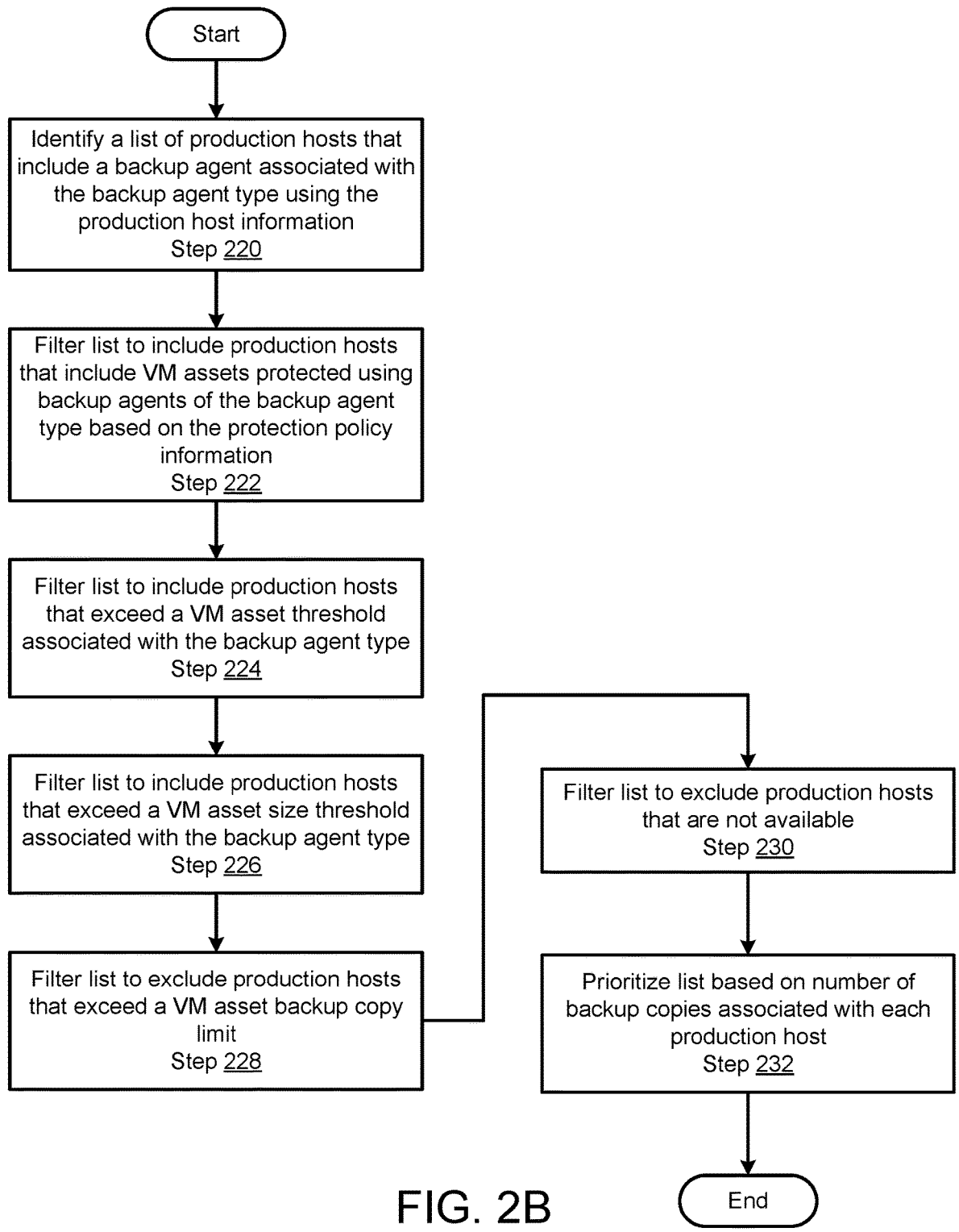
FIG. 2B shows a flowchart of a method for generating an upgrade schedule in accordance with one or more embodiments disclosed herein.

FIG. 2B shows a flowchart of a method for generating an upgrade schedule in accordance with one or more embodiments disclosed herein. The method shown in FIG. 2B may be performed by, for example, a data protection manager (110, FIG. 1A). Other components of the system illustrated in FIGS. 1A-1C may perform all, or a portion, of the method of FIG. 2B without departing from embodiments disclosed herein. While various steps in the flowchart are presented and described sequentially, one of ordinary skill in the relevant will appreciate that some or all of the steps may be executed in different orders, may be combined or omitted, and some or all of the steps may be executed in parallel.

In Step 220, a list of production hosts that include a backup agent associated with the backup agent type is generated using the production host information. In one or more embodiments, the data protection manager may generate a list of production hosts that include a backup agent associated with the backup agent type corresponding to the backup agent type associated with the backup agent update event identified in Step 200 of FIG. 2A. The production host information may specify the backup agent types associated with each production hosts. The data protection manager may use the production host information to generate the list. The data protection manager may ignore production hosts that include the newest version of the backup agent type. The list of production hosts that include the backup agent associated with the backup agent type may be generated using the production host information via other and/or additional methods without departing from embodiments disclosed herein.

In Step 222, the list is filtered to include production hosts that include VM assets protected using backup agents of the backup agent type. In one or more embodiments, the data protection manager may identify production hosts that include VMs and VM assets that are associated with active protection policies that include the backup agent type. The data protection manager may use the protection policy information to identify production hosts that include VM assets that are protected by using backup agents of the backup agent type. The data protection manager may filter out or otherwise exclude from the list of production hosts that include a backup agent of the backup agent type, but that do not have VM assets that are being protected using backup agents of the backup agent type. The list may be filtered to include production hosts that include VM assets protected using backup agents of the backup agent type via other and/or additional methods without departing from embodiments disclosed herein.

In Step 224, the list is filtered to include production hosts that exceed a VM asset threshold associated with the backup agent type. In one or more embodiments, the data protection manager may filter the list to include production hosts that include a significant amount of VM assets protected by backup agents associated with the backup agent type based on a VM asset threshold. The VM asset threshold may be a user configurable proportion of the total number of VM assets on a production host, which when exceeded by VM assets protected by backup agents of the backup agent type for a production host, results in the inclusion of the production host in the list of production hosts for backup agent upgrade. If a production host does not exceed the VM asset threshold (i.e., the proportion of VM assets protected using backup agents of the backup agent type is below the VM asset threshold), then the data protection manager will withhold the production host from the list but still will consider the production host in Step 226. The list may be filtered to include production hosts that exceed a VM asset threshold associated with the backup agent type via other and/or additional methods without departing from embodiments disclosed herein.

As an example, consider a scenario in which there are two production hosts and a VM asset threshold of 50 percent. The first production host may include 95 percent of its VM assets protected using backup agents of the backup agent type, and the second production host may include 20 percent of its VM assets protected using backup agents of the backup agent type. Accordingly, the data protection manager may include the first production host in the list and withhold the second production host from the list.

In Step 226, the list is filtered to include production hosts that exceed a VM asset size threshold associated with the backup agent type. In one or more embodiments, the data protection manager may filter the list to include production hosts that include a significant amount of data of VM assets protected by backup agents associated with the backup agent type based on a VM asset size threshold. The VM asset size threshold may be a user configurable proportion of the total size of VM assets on a production host, which when exceeded by VM assets protected by backup agents of the backup agent type for a production host, results in the inclusion of the production host in the list of production hosts for backup agent upgrade. If a production host does not exceed the VM asset size threshold (i.e., the proportion of the total size VM assets protected using backup agents of the backup agent type is below the VM asset size threshold), then the data protection manager will withhold the production host from the list. Production hosts that were excluded in Step 224 may be reconsidered and included if the VM assets' size of VM assets protected using backup agents of the backup type exceeds the VM asset size threshold regardless of whether VM assets protected using backup agents of the backup agent type fail to exceed the VM asset threshold. Similarly, production hosts that were included in the list in Step 224 may be removed from the list if the VM assets size of VM assets protected using backup agents of the backup type fails to exceed the VM asset size threshold, regardless of whether the VM assets protected using backup agents of the backup agent type exceed the VM asset threshold. The list may be filtered to include production hosts that exceed a VM asset size threshold associated with the backup agent type via other and/or additional methods without departing from embodiments disclosed herein.

As an example, consider a scenario in which there are two production hosts and a VM asset size threshold of 50 percent. The first production host may include 95 percent of its total VM asset size corresponding to VM assets protected using backup agents of the backup agent type, and the second production host may include 20 percent of its total VM asset size corresponding to VM assets protected using backup agents of the backup agent type. Accordingly, the data protection manager may include the first production host in the list and withhold the second production host from the list.

Steps 224 and 226 ensure that only production hosts that are predominantly protected by backup agents of the backup agent type are included in the upgrade schedule. Other production hosts may be backed up using different backup agent types or may have their backup agents of the backup agent type manually upgraded. As a result, the efficiency and reliability of upgrading backup agents of the backup agent type may be improved, and unnecessary production hosts may not be included in backup agent upgrades resulting in a waste of system resources and an increased risk of incurring backup agent upgrade failures.

In Step 228, the list is filtered to exclude production hosts that exceed a VM asset backup copy limit. In one or more embodiments, the data protection manager may exclude production hosts from the list that include an amount of backup copies that exceed a user configurable backup copy limit. The backup copy limit may specify a maximum allowable number of backup copies associated with the VMs of each production host. The amount of backups generated by the production host may be specified by the backup metadata included in the production host information. If the VMs of a production host have more backup copies than specified by the backup copy limit, then the data protection manager may exclude the production host from the list. If the VMs of a production host have less or the same amount of backup copies than specified by the backup copy limit, then the data protection manager may include the production host from the list. The more backup copies associated with a production host, the less important it may be to upgrade the backup agents of the backup agent type on the production host to continue generating backups using the backup agents of the backup agent type because the production host may be well protected. The data protection manager may ignore production hosts that are well protected to improve the efficiency and reliability of performing backup agent upgrades. The list may be filtered to exclude production hosts that exceed a VM asset backup copy limit via other and/or additional methods without departing from embodiments disclosed herein.

In Step 230, the list is filtered to exclude production hosts that are not available. In one or more embodiments, the data protection manager may filter the list to exclude production hosts that are associated with status indicators that indicate any other status than on and available. The status indicators associated with each production host may be included in the production host information. The data protection manager may check the status indicator associated with each production host included in the list and exclude production hosts that are associated with status indicators that indicate any other status than on and available. As a result, backup agent upgrade may not be attempted on production hosts that are unavailable avoiding negative consequences of attempting upgrades on an unavailable production host such as timeouts, upgrade failures, upgrade delays, etc. The list may be filtered to exclude production hosts that are not available via other and/or additional methods without departing from embodiments disclosed herein.

In Step 232, the list is prioritized based on the number of backup copies associated with each production host to generate the upgrade schedule. In one or more embodiments, the data protection manager may prioritize the list based on the number of backup copies associated with each production host. The amount of backups generated by the production host may be specified by the backup metadata included in the production host information. As discussed above, the more backup copies associated with a production host, the less important it may be to upgrade the backup agents of the backup agent type on the production host to continue generating backups using the backup agents of the backup agent type because the production host may be well protected. The data protection manager may prioritize upgrading backup agents of production hosts that are not well protected (i.e., production hosts that are not associated with a lot of backup copies) before upgrading backup agents of production hosts that are well protected (i.e., production hosts that are associated with a lot of backup copies) to avoid catastrophic data loss scenarios in poorly protected production hosts. Accordingly, the data protection manager may order the list of production hosts. The ordered list of production hosts may include production hosts associated with fewer backup copies placed before production hosts associated with more backup copies. This ordered list of production hosts may be the backup agent upgrade schedule used in Steps 208-216 in FIG. 2A. The list may be prioritized based on the number of backup copies associated with each production host to generate the upgrade schedule.

In one or more embodiments disclosed herein, the method ends following Step 232.

As discussed above, embodiments disclosed herein may be implemented using computing devices. FIG. 3 shows a diagram of a computing device in accordance with one or more embodiments disclosed herein. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

As used herein, an entity that is programmed to or configured to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

One or more embodiments disclosed herein may be implemented using instructions executed by one or more processors of the data management device. Further, such instructions may correspond to computer readable instructions that are stored on one or more non-transitory computer readable mediums. In one or more embodiments, any non-volatile storage (not shown) and/or memory (not shown) of a computing device or system of computing devices may be considered, in whole or in part, as non-transitory computer readable mediums, which may store software and/or firmware. Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein. The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

The problems discussed above should be understood as being examples of problems solved by embodiments disclosed herein and the embodiments disclosed herein should not be limited to solving the same/similar problems. The disclosed embodiments are broadly applicable to address a range of problems beyond those discussed herein.

While the embodiments disclosed herein have been described above with respect to a limited number of embodiments, those skilled in the art, having the benefit of this disclosure, will appreciate that other embodiments can be devised which do not depart from the scope of the embodiments disclosed herein. Accordingly, the scope of the embodiments disclosed herein should be limited only by the attached claims.

What is claimed is:

1. A method for managing upgrades of backup agents in a data cluster, comprising:
   identifying, by a data protection manager, a backup agent upgrade event associated with a backup agent type of backup agent types and a data cluster comprising a plurality of production hosts, wherein the plurality of production hosts comprise virtual machines (VMs);
   in response to identifying the backup agent upgrade event:
      obtaining production host information associated with the plurality of production hosts;
      obtaining protection policy information associated with the plurality of production hosts;
      generating an upgrade schedule specifying a portion of production hosts of the plurality of production hosts associated with backup agent upgrades of backup agents of the backup agent type using the production host information and the protection policy information by:
         filtering a list of production hosts of the plurality of production hosts to include production hosts that exceed a VM asset threshold associated with the backup agent type;
         filtering the list to include production hosts that exceed a VM asset size threshold associated with the backup agent type;
         filtering the list to exclude production hosts that exceed a VM asset backup copy limit;
         and filtering the list to exclude production hosts that are not available; and
      initiating performance of backup agent upgrades on the portion of the plurality of production hosts based on the upgrade schedule.

2. The method of claim 1, wherein the production host information specifies:
   a status of each production host;
   VMs associated with each production host;
   VM assets associated with each VM;
   a number of backup copies associated with each VM asset of the VM assets; and
   a size of each VM asset.

3. The method of claim 1, wherein the protection policy information specifies:
   backup agent types associated with each VM asset of the VM assets; and
   a backup schedule associated with each VM asset of the VM assets.

4. The method of claim 1, wherein the backup agent types comprise:
   a first backup agent type that performs a first type of VM backup; and
   a second backup agent type that performs a second type of VM backup.

5. A method for managing upgrades of backup agents in a data cluster, comprising:
   identifying, by a data protection manager, a backup agent upgrade event associated with a backup agent type of backup agent types and a data cluster comprising a plurality of production hosts, wherein the plurality of production hosts comprise virtual machines (VMs);

in response to identifying the backup agent upgrade event:
obtaining production host information associated with the plurality of production hosts;
obtaining protection policy information associated with the plurality of production hosts;
generating an upgrade schedule specifying a portion of production hosts of the plurality of production hosts associated with backup agent upgrades of backup agents of the backup agent type using the production host information and the protection policy information by:
filtering a list of production hosts of the plurality of production hosts to include production hosts that exceed a VM asset threshold associated with the backup agent type;
filtering the list to include production hosts that exceed a VM asset size threshold associated with the backup agent type; and
initiating performance of backup agent upgrades on the portion of the plurality of production hosts based on the upgrade schedule.

6. The method of claim 5, wherein generating an upgrade schedule specifying eligible production hosts associated with backup agent upgrades using the production host information and the protection policy information further comprises:
prior to filtering the list of production hosts of the plurality of production hosts to include production hosts that exceed a VM asset threshold associated with the backup agent type:
identifying the list of production hosts of the plurality of production hosts that include backup agents associated with the backup agent type; and
after filtering the list to include production hosts that exceed a VM asset size threshold associated with the backup agent type:
filtering the list to exclude production hosts that exceed a VM asset backup copy limit; and
filtering the list to exclude production hosts that are not available.

7. The method of claim 5, wherein the production host information specifies:
a status of each production host;
VMs associated with each production host;
VM assets associated with each VM;
a number of backup copies associated with each VM asset of the VM assets; and
a size of each VM asset.

8. The method of claim 5, wherein the protection policy information specifies:
backup agent types associated with each VM asset of the VM assets; and
a backup schedule associated with each VM asset of the VM assets.

9. The method of claim 5, wherein the backup agent types comprise:
a first backup agent type; and
a second backup agent type.

10. The method of claim 5, wherein the VM asset threshold specifies a proportion of a total of VM assets of a production host that are backed up using backup agents of the backup agent type.

11. The method of claim 5, wherein the VM asset size threshold specifies a proportion of a total VM asset size on a production host that are that are backed up using backup agents of the backup agent type.

12. A method for managing upgrades of backup agents in a data cluster, comprising:
identifying, by a data protection manager, a backup agent upgrade event associated with a backup agent type of backup agent types and a data cluster comprising a plurality of production hosts, wherein the plurality of production hosts comprise virtual machines (VMs);
in response to identifying the backup agent upgrade event:
obtaining production host information associated with the plurality of production hosts;
obtaining protection policy information associated with the plurality of production hosts;
generating an upgrade schedule specifying a portion of production hosts of the plurality of production hosts associated with backup agent upgrades of backup agents of the backup agent type using the production host information and the protection policy information; and
initiating performance of backup agent upgrades on the portion of the plurality of production hosts based on the upgrade schedule.

13. The method of claim 12, wherein generating an upgrade schedule specifying eligible production hosts associated with backup agent upgrades using the production host information and the protection policy information comprises:
identifying a list of production hosts of the plurality of production hosts associated with the backup agent type using the production host information;
filtering the list to include production hosts that include VM assets protected using backup agents associated with the backup agent type;
filtering the list to include production hosts that exceed a VM asset threshold associated with the backup agent type;
filtering the list to include production hosts that exceed a VM asset size threshold associated with the backup agent type;
filtering the list to exclude production hosts that exceed a VM asset backup copy limit; and
filtering the list to exclude production hosts that are not available.

14. The method of claim 13, wherein the VM asset threshold specifies a proportion of a total of VM assets of a production host that are backed up using backup agents of the backup agent type.

15. The method of claim 13, wherein the VM asset size threshold specifies a proportion of a total VM asset size on a production host that are that are backed up using backup agents of the backup agent type.

16. The method of claim 12, wherein the production host information specifies:
a status of each production host;
VMs associated with each production host;
VM assets associated with each VM;
a number of backup copies associated with each VM asset of the VM assets; and
a size of each VM asset.

17. The method of claim 12, wherein the protection policy information specifies:
backup agent types associated with each VM asset of the VM assets; and
a backup schedule associated with each VM asset of the VM assets.

18. The method of claim 12, wherein the backup agent types comprise:
 a first backup agent type; and
 a second backup agent type.

19. The method of claim 12, wherein the upgrade schedule is prioritized based on a number of backup copies associated with each production host.

20. The method of claim 12, wherein the backup agent upgrade event comprises one selected from a group consisting of at least:
 an upgrade of the data protection manager;
 obtaining a request from a user;
 identifying a change in status of a production host of the plurality of production hosts;
 identifying a change in the protection policy information associated with a production host of the plurality of production hosts.

\* \* \* \* \*